United States Patent
Huang et al.

(10) Patent No.: US 10,691,465 B2
(45) Date of Patent: Jun. 23, 2020

(54) METHOD FOR SYNCHRONIZATION OF SYSTEM MANAGEMENT DATA

(71) Applicant: MITAC COMPUTING TECHNOLOGY CORPORATION, Taoyuan (TW)

(72) Inventors: Po-Wen Huang, Taoyuan (TW); Le Xing, Taoyuan (TW); Bichao Wang, Taoyuan (TW); Cheng-Chieh Yeh, Taoyuan (TW); Jie Zhang, Taoyuan (TW); Chen-Nan Hsiao, New Taipei (TW)

(73) Assignee: Mitac Computing Technology Corporation, Taoyuan (TW)

( * ) Notice: Subject to any disclaimer, the term of this patent is extended or adjusted under 35 U.S.C. 154(b) by 92 days.

(21) Appl. No.: 16/191,509

(22) Filed: Nov. 15, 2018

(65) Prior Publication Data
US 2019/0146804 A1 May 16, 2019

(30) Foreign Application Priority Data
Nov. 16, 2017 (TW) .............................. 106139649 A

(51) Int. Cl.
*G06F 9/44* (2018.01)
*G06F 9/4401* (2018.01)
*G06F 21/64* (2013.01)
*G06F 3/06* (2006.01)

(52) U.S. Cl.
CPC .......... *G06F 9/4401* (2013.01); *G06F 3/0604* (2013.01); *G06F 3/065* (2013.01); *G06F 3/0673* (2013.01); *G06F 21/64* (2013.01)

(58) Field of Classification Search
CPC ................................ G06F 9/4411; G06F 21/64
See application file for complete search history.

(56) References Cited

U.S. PATENT DOCUMENTS

| 2008/0126586 A1* | 5/2008 | Shih ....................... G06F 9/4411 |
| | | 710/10 |
| 2009/0019278 A1* | 1/2009 | Shah ................... G06F 9/44536 |
| | | 713/100 |

FOREIGN PATENT DOCUMENTS

| TW | 201314576 A | 4/2013 |
| TW | 201423391 A | 6/2014 |

OTHER PUBLICATIONS

Search Report appended to an Office Action issued to Taiwanese counterpart application No. 106139649 by the TIPO dated Jun. 19, 2018, 2 pages.

* cited by examiner

*Primary Examiner* — Albert Wang
(74) *Attorney, Agent, or Firm* — Michael Best & Friedrich LLP

(57) ABSTRACT

A method for synchronization of system management data includes steps of generating a request for system management data in response to execution of a system booting program, transmitting the request to a baseboard management controller so as to enable the baseboard management controller to transmit the system management data stored in a second storage unit to a processor; receiving the system management data from the baseboard management controller, and determining whether the system management data is complete; and when it is determined that the system management data is complete, storing at least one of the sequential packets of the system management data in a first storage unit, and proceeding with execution of the system booting program.

9 Claims, 3 Drawing Sheets

METHOD FOR SYNCHRONIZATION OF SYSTEM MANAGEMENT DATA

CROSS-REFERENCE TO RELATED APPLICATION

This application claims priority of Taiwanese Invention Patent Application No. 106139649, filed on Nov. 16, 2017.

FIELD

The disclosure relates to a synchronization method, and more particularly to a method for synchronization of system management data during boot-up.

BACKGROUND

Referring to FIG. 1, a conventional computer device 1 includes a storage module 11 that stores a basic input/output system (BIOS), a baseboard management controller (BMC) 12, a central processing unit (CPU) 13, and a platform controller hub (PCH) 14 that is electrically connected with the storage module 11, the BMC 12 and the CPU 13. When the computer device 1 is booted up, the CPU 13 loads and executes the BIOS via the PCH 14 so as to initialize each input/output unit for use by a user.

When a new hardware is mounted on the computer device 1, the BIOS may need an update in order to support the new hardware. When an updating process is performed, the BIOS originally stored in the storage module 11 of the computer device 1 (referred to as an original BIOS) is first erased, and a new BIOS is then stored in the storage module 11 of the computer device 1. In other words, data related to the original BIOS, such as original system data which is stored along with the original BIOS in the storage module 11 and which should be retained, are all cleared. Moreover, when the BIOS is revised manually, the original system data may be damaged during the manual revision. For example, when the user intends to revise some information in the BIOS by way of overwriting a part of data corresponding to the information, during the overwriting process, the original system data may be incomplete because a portion of the original system data is accidentally overwritten. Therefore, it is desired to retain the original system data, such as important data related to system management BIOS (SMBIOS) information, in the new BIOS after a BIOS update or revision.

The SMBIOS information contains all kinds of hardware configuration information associated with the computer device 1, including specifications such as version information of the BIOS, name of the manufacturer, product serial number, etc., for facilitating management of the computer device 1.

After the BIOS is updated, the SMBIOS information may be reset, and the user can only manually revise the specifications of the SMBIOS information by using specific tools via the PCH 14, or by remote control over the BMC 12 and the PCH 14. However, it is troublesome for the user to revise the specifications of the SMBIOS information manually each time the BIOS is updated. Moreover, the specifications of the SMBIOS after manual revision may be incomplete and may lead to malfunction of the BIOS. For example, after a server is powered on, an operating system (OS) of the server will not be loaded until a booting process of the BIOS (e.g., the power-on self test, POST, procedure for hardware check and memory configurations) has been completed. Therefore, the malfunction of the BIOS may cause the server to be unable to finish its booting process so the OS will not be executed or the system crashes.

SUMMARY

Therefore, an object of the disclosure is to provide a method for synchronization of system management data that can automatically check completeness of system management data, that can automatically store the system management data, and that can alleviate at least one of the drawbacks of the prior art.

The method for synchronization of system management data is to be implemented by a processor included in a computer device. The computer device further includes a first storage unit that is electrically connected to the processor and that stores a system booting program used for a booting process of the computer device, a baseboard management controller that is electrically connected to the processor, and a second storage unit that is electrically connected to the baseboard management controller and that stores system management data including a plurality of sequential packets. Some of the sequential packets carry system information which is related to the system booting program. The method includes steps of:

a) in response to execution of the system booting program, generating a request for the system management data, and transmitting the request to the baseboard management controller so as to enable the baseboard management controller to transmit, based on the request, the system management data stored in the second storage unit to the processor;

b) receiving the system management data from the baseboard management controller, and determining whether the system management data is complete; and c) when it is determined that the system management data is complete, storing at least one of the sequential packets of the system management data in the first storage unit, and proceeding with execution of the system booting program.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
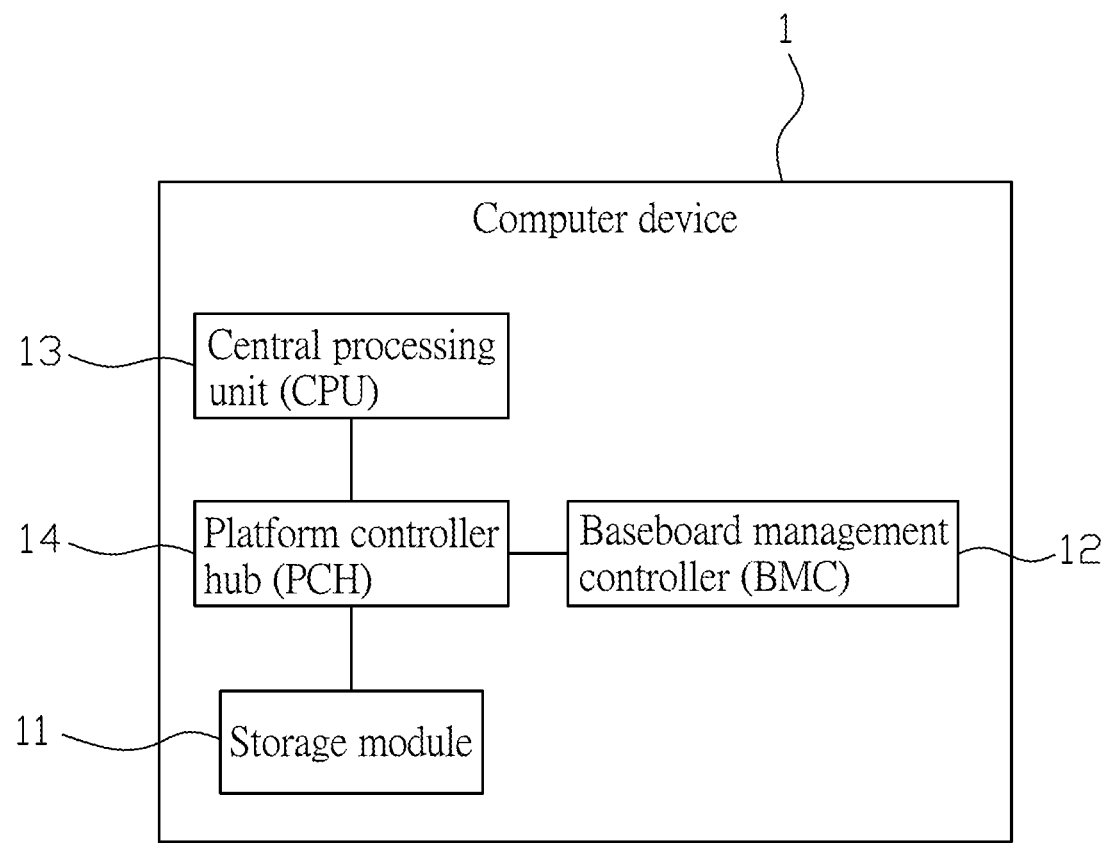
FIG. 1 is a block diagram illustrating a conventional computer device.
Figure 2:
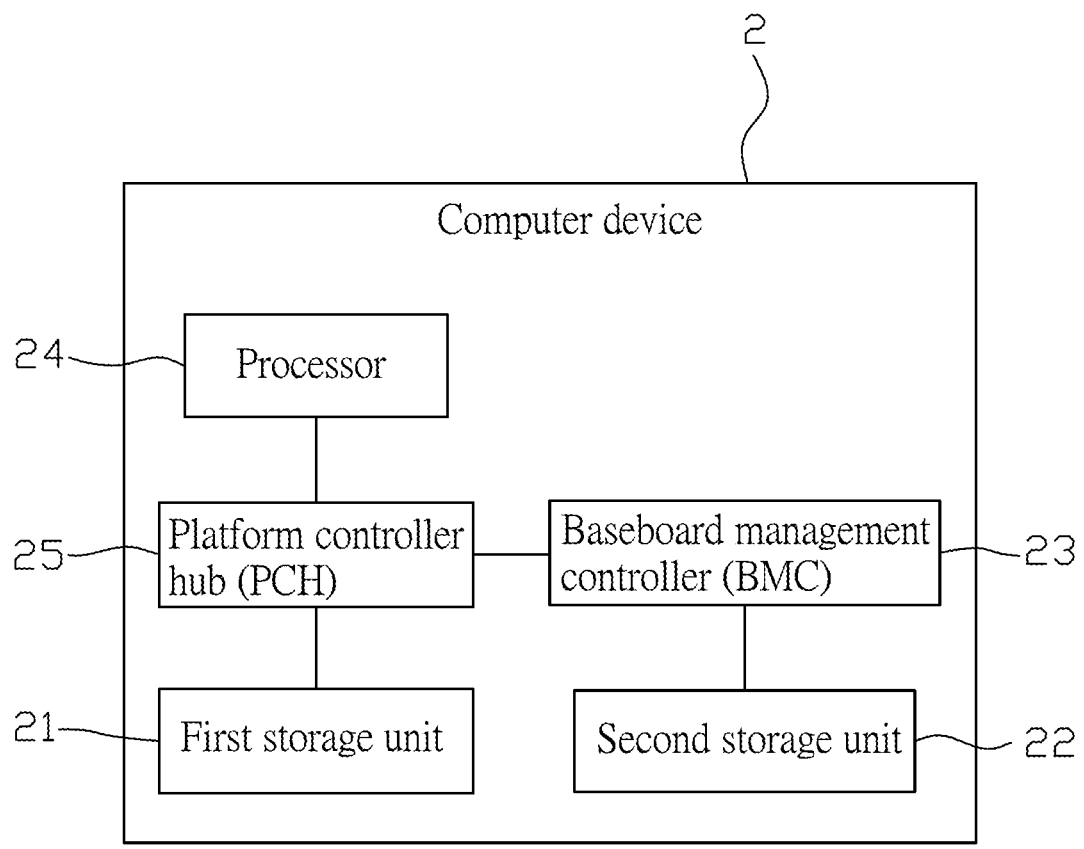
FIG. 2 is a block diagram illustrating an embodiment of a computer device which is adopted to implement a method for synchronization of system management data according to the disclosure.

Referring to FIG. 2, an embodiment of a computer device 2 used to implement a method for synchronization of system management data according to the disclosure is illustrated. The computer device 2 includes a first storage unit 21, a second storage unit 22, a baseboard management controller (BMC) 23 electrically connected to the second storage unit 22, a processor 24, and a platform controller hub (PCH) 25 electrically connected with the first storage unit 21, the BMC 23 and the processor 24. In this embodiment, the first storage unit 21 is exemplified by a flash memory, the second storage unit 22 is exemplified by an electrically-erasable programmable read-only memory (EEPROM), and the processor 24 is exemplified by a central processing unit (CPU).

In another embodiment, for the computer device 2 that includes an integrated chip set, such as a system on a chip (SoC) that includes a CPU, a northbridge which is usually integrated in the CPU, and a southbridge, since the southbridge executes functions of a PCH, the PCH 25 is omitted, and the SoC is directly connected with the first storage unit 21.

The first storage unit 21 stores codes for a system booting program used for a booting process of the computer device 2. In this embodiment, the system booting program is exemplified by a basic input/output system (BIOS) program.

The second storage unit 22 stores system management data and an authentication code. The system management data includes a plurality of sequential packets. Some of the sequential packets carry system information which is related to the system booting program, and remaining ones of the sequential packets carry board information and chassis information regarding a board and chassis where the computer device 2 is mounted. Each of the sequential packets has a header which contains length information indicating a length of the packet, type information indicating a type of the packet, and an authentication value. In this embodiment, the sequential packets of the system management data stored in the second storage unit 22 are implemented to be field replaceable unit (FRU) data. The FRU data include metadata of replaceable devices, such as supplier identifiers (IDs), manufacturers, serial numbers, fabrication dates, etc. The system information is exemplified as part of the SM BIOS information containing, for example, version information of the BIOS, name of manufacturer of the computer device 2, product serial number, etc., for facilitating management of the computer device 2. The user is able to input instruction for revising the system information via a tool or remote control to the BMC 23 so as to revise the system information. Specifically, the revision of the system information herein refers to, for example, revision the FRU data stored in the second storage unit (i.e., the EERPOM) which is connected with the BMC 23.

It should be noted that storage of the system management data in the second storage unit 22 may serve as backup to the system management data that are implemented to be SMBIOS data originally stored in the first storage unit 21, in case the system management data is damaged during update and/or revision processes of BIOS. In other embodiments, the system management data in the second storage unit 22 are not necessarily the SMBIOS data originally stored in the first storage unit 21.

Figure 3:
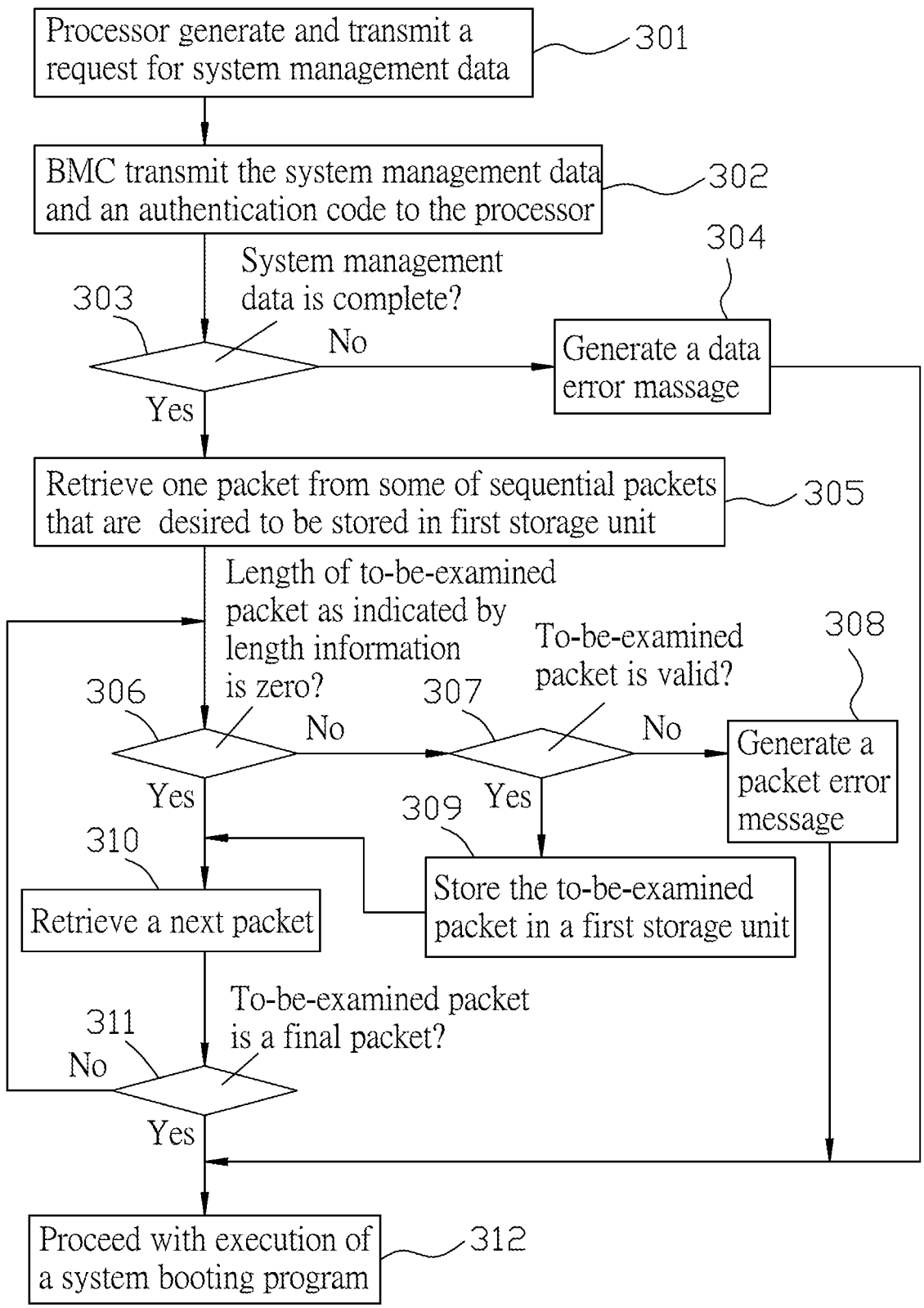
FIG. 3 is a flow chart illustrating an embodiment of the method for synchronization of system management data according to the disclosure.

Referring to FIGS. 2 and 3, an embodiment of the method for synchronization of system management data according to the disclosure is illustrated. The method includes the following steps.

In step 301, in response to execution of the system booting program, the processor 24 generates a request for the system management data, and transmits the request to the BMC 23.

In step 302, in response to receipt of the request for the system management data, the BMC 23 transmits, based on the request, the system management data and the authentication code stored in the second storage unit 22 to the processor 24 via the PCH 25. In an embodiment that an SoC including a CPU and a southbridge is used to replace the processor 24 and the PCH 25, in response to receipt of the request, the BMC 23 directly transmits the FRU data stored in the second storage device 22 to the SoC for subsequent substitution, update or revision of the SM BIOS data originally stored in the first storage device 21.

In step 303, the processor 24 receives the system management data and the authentication code from the BMC 23 via the PCH 25, and determines whether the system management data is complete based on the authentication code and the authentication value contained in the header of each of the sequential packets included in the system management data. In practice, only specific ones of the sequential packets are used to check completeness. The specific ones of the sequential packets correspond to items (i.e., parameters) that are desired to be synchronized. For example, the items desired to be synchronized include product name and part number of the system information, and board manufacturer and board number of the board information, but the chassis information carried by other sequential packets is not desired to be synchronized in the first storage unit 21. As a result, only the headers of the desired ones of the sequential packets which carry the system information and the board information are used for making the determination in step 303. In other embodiments, it may be desired to load the chassis information carried by other sequential packets into the first storage unit 21 for synchronization of data. Therefore, the sequential packets which carry the chassis information may also be used for making the determination in step 303. In this way, the processor 24 is able to determine validity of the specific ones of the sequential packets of the system management data that contain the items that are desired to be stored in the first storage unit 21. In this embodiment, the authentication code is a checksum, and the processor 24 determines that the system management data is complete, that is, the system management data is valid, when it is determined that a sum of the authentication values contained in the headers of the sequential packets is equal to the authentication code. When it is determined by the processor 24 that the system management data is not complete, i.e., invalid, the processor 24 performs step 304. When it is determined by the processor 24 that the system management data is complete, the processor 24 performs step 305.

In step 304, the processor 24 generates a data error message notifying that there is an error in the system management data. For instance, the processor 24 creates a flag indicating an FRU error.

In step 305, the processor 24 retrieves one packet from said specific ones of the sequential packets that are included in the system management data and that contain the items desired to be stored in the first storage unit 21. If step 305 is performed for the first time, the processor 24 retrieves a first packet of said specific ones of the sequential packets that contain the items desired to be stored in the first storage unit 21.

In step 306, the processor 24 determines, based on the length information contained in the header of the packet thus retrieved serving as a to-be-examined packet, whether a length of the to-be-examined packet as indicated by the length information is zero. When it is determined that the length of the to-be-examined packet indicated by the length information is not zero, the processor 24 performs step 307. When it is determined that the length of the to-be-examined packet as indicated by the length information is zero, the processor 24 performs step 310.

In step 307, the processor 24 determines whether the to-be-examined packet is valid. When it is determined that the to-be-examined packet is not valid, the processor 24 performs step 308. When it is determined that the to-be-examined packet is valid, the processor 24 performs step 309.

In this embodiment, the processor 24 determines whether an actual length of the to-be-examined packet conforms to the length information contained in the header of the to-be-examined packet, and whether a type of the to-be-examined packet conforms to the type information contained in the header of the to-be-examined packet, so as to determine if the to-be-examined packet is valid. Specifically, a number of bytes of data carried by the to-be-examined packet is determined by the processor 24 to serve as the actual length of the to-be-examined packet. When it is determined that the actual length of the to-be-examined packet does not conform to the length information contained in the header of the to-be-examined packet or that the type of the to-be-examined packet does not conform to the type information contained in the header of the to-be-examined packet, or both, the processor 24 determines that the to-be-examined packet is invalid. In contrast, when it is determined that the actual length of the to-be-examined packet conforms to the length information contained in the header of the to-be-examined packet and that the type of the to-be-examined packet conforms to the type information contained in the header of the to-be-examined packet, the processor 24 determines that the to-be-examined packet is valid. In other embodiments, the processor 24 may determine only one of whether the actual length of the to-be-examined packet conforms to the length information contained in the header and whether the type of the to-be-examined packet conforms to the type information contained in the header, in order to determine if the to-be-examined packet is valid.

In step 308, the processor 24 generates a packet error message notifying that there is an error in the to-be-examined packet. For instance, the processor 24 creates a flag indicating an FRU error. It should be noted that when the processor 24 determines that there exists an invalid packet among said specific ones of the sequential packets that contain the items desired to be stored in the first storage unit 21 and that are stored in the second storage unit 22, it means that the system information may be erroneous. Accordingly, the processor 24 refrains from proceeding to retrieve packets following the invalid packet, and refrains from proceeding to store packets following the invalid packet. In this way, the time it takes to determine if a packet is valid or to store the packet can be saved.

In step 309, the processor 24 stores the to-be-examined packet in the first storage unit 21 via the PCH 25.

In a variant of this embodiment, subsequent to step 307 and prior to step 309, the processor 24 further determines validity for each item (e.g., the product name and the part number of the system information) in the to-be-examined packet by determining whether the data length of the item is zero (i.e., zero bytes). This additional step is able to more accurately confirm validity of the data to be stored.

In step 310, which is subsequent to step 306 or 309, the processor 24 retrieves a next packet, which is next in sequence to the to-be-examined packet, from said specific ones of the sequential packets that are included in the system management data and that contain the items desired to be stored in the first storage unit 21.

In step 311, the processor 24 determines, based on the to-be-examined packet having underwent step 306 or 309 and the next packet retrieved in step 311, whether the to-be-examined packet is a final packet of said specific ones of the sequential packets that contain the items desired to be stored in the first storage unit 21. It should be noted that the final packet is a last one of said specific ones of the sequential packets that include items desired to be copied and stored in the first storage unit 21. This step is performed to make sure that all of the sequential packets including the items desired to be copied and stored are verified as valid and stored in the first storage unit 21. When it is determined that the to-be-examined packet is the final packet, the packets stored in the first storage unit 21 by repeated performance of step 309 cooperate to carry the entirety of the system information, and the processor 24 performs step 312. When it is determined that the to-be-examined packet is not the final packet, the processor 24 performs steps 306 to 311 once again with the next packet retrieved in step 310 serving as the to-be-examined packet.

It should be noted that in the loop including steps 306 to 311, the processor 24 determines whether the to-be-examined packet is valid in an order from the first packet to the final packet among said some of the sequential packets that carry the system information.

In step 312, which is subsequent to one of steps 304, 308 and 311, the processor 24 proceeds with execution of the system booting program.

It should be noted that in this disclosure, the BMC 23 is directly instructed to revise the system management data (i.e., the FRU data) stored in the second storage unit 22 (i.e., the EERPOM) which is connected with the BMC 23, and the SM BIOS data stored in the first storage unit 21 will be automatically synchronized with the FRU data stored in the EEPROM next time the computer device 2 boots up. In addition, before the synchronization is performed, the FRU data should be verified to be complete and correct. The processing unit 24 is configured to copy the FRU data to the first storage device only when the FRU data is verified to be complete and correct. In other words, the SMBIOS data are updated and/or revised primarily based on the FRU data which are stored in the second storage unit 22 connected with the BMC 23.

To sum up, in the method for synchronization of system management data according to the disclosure, when the processor 24 determines that the system management data is complete, and that all of said some of the sequential packets which carry the system information are valid, the processor 24 stores said some of the sequential packets, which carry the system information and which are originally stored in the second storage unit 22, into the first storage unit 21. By automatically storing the system information each time the system booting program is being executed, the system information which is cleared during an update process can be restored in the first storage unit 21. Moreover, before storage of the system information, completeness of the system management data should be confirmed and said some of the sequential packets which carry the system information should be determined as valid. It should be noted that when one of the sequential packets is determined as valid, it means that contents of the one of the sequential packets are correct. In this disclosure, before storing at least one of the sequential packets of the system management data in the first storage unit for data synchronization, a length of contents and a type of the contents stored in the sequential packet are verified so as to further make sure the correctness of the contents stored in the sequential packet. In this way, automatic storage in the first storage unit 21 of incomplete or invalid system information which may cause the system booting program to malfunction during the booting process can be prevented.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for synchronization of system management data to be implemented by a processor included in a computer device, the computer device further including a first storage unit that is electrically connected to the processor and that stores a system booting program used for a booting process of the computer device, a baseboard management controller that is electrically connected to the processor, and a second storage unit that is electrically connected to the baseboard management controller and that stores system management data including a plurality of sequential packets, some of the sequential packets carrying system information which is related to the system booting program, the method comprising steps of:
   a) in response to execution of the system booting program, generating a request for the system management data, and transmitting the request to the baseboard management controller so as to enable the baseboard management controller to transmit, based on the request, the system management data stored in the second storage unit to the processor;
   b) receiving the system management data from the baseboard management controller, and determining whether the system management data is complete; and
   c) when it is determined that the system management data is complete, storing at least one of the sequential packets of the system management data in the first storage unit, and proceeding with execution of the system booting program.

2. The method of claim 1, wherein step c) includes sub-steps of:
   c-1) retrieving one packet from specific ones of the sequential packets that are included in the system management data and that contain items desired to be stored in the first storage unit when it is determined that the system management data is complete;
   c-2) determining whether the packet thus retrieved serving as a to-be-examined packet is valid;
   c-3) storing the to-be-examined packet in the first storage unit when it is determined that the to-be-examined packet is valid;
   c-4) retrieving a next packet, which is next in sequence to the to-be-examined packet, from the sequential packets included in the system management data, and determining, based on the to-be-examined packet and the next packet, whether the to-be-examined packet is a final packet of said specific ones of the sequential packets that carry the system information;
   c-5) when it is determined that the to-be-examined packet is not the final packet, performing sub-steps c-2) to c-4) once again with the next packet serving as the to-be-examined packet; and
   c-6) when it is determined that the to-be-examined packet is the final packet, proceeding with execution of the system booting program, where the packets stored in the first storage unit by repeated performance of sub-step c-3) cooperate to carry the system information.

3. The method of claim 2, each of the sequential packets having a header which contains length information indicating a length of the packet, wherein sub-step c-2) includes:
   determining whether the to-be-examined packet is valid by determining whether an actual length of the to-be-examined packet conforms to the length information contained in the header of the to-be-examined packet.

4. The method of claim 2, each of the sequential packets having a header which contains type information indicating a type of the packet, wherein sub-step c-2) includes:
   determining whether the to-be-examined packet is valid by determining whether a type of the to-be-examined packet conforms to the type information contained in the header of the to-be-examined packet.

5. The method of claim 2, each of the sequential packets has a header which contains length information indicating a length of the packet, wherein
   step c) further includes, between subs-steps c-1) and c-2), a sub-step of:
   c-7) determining, based on the length information contained in the header of the to-be-examined packet thus retrieved, whether a length of the to-be-examined packet thus retrieved as indicated by the length information is zero;
   when it is determined that the length of the to-be-examined packet thus retrieved as indicated by the length information is not zero, performing sub-step c-2);
   when it is determined that the length of the to-be-examined packet thus retrieved as indicated by the length information is zero, performing sub-step c-4); and
   sub-step c-5) includes, when it is determined that the to-be-examined packet is not the final packet, performing steps c-7) and c-2) to c-4) once again with the next packet serving as the to-be-examined packet.

6. The method of claim 2, wherein step c) further includes, subsequent to subs-step c-2), a sub-step of:
   c-8) generating a packet error message notifying that there is an error in the to-be-examined packet when it is determined that the to-be-examined packet is not valid.

7. The method of claim 2, remaining ones of the sequential packets carrying board information and chassis information regarding a board and chassis where the computer device is mounted,
   wherein in sub-step c-1), said specific ones of the sequential packets that are included in the system management data and that contain items desired to be stored in the first storage unit carry the system information, the board information, the chassis information, or any combination of the system information, the board information and the chassis information.

8. The method of claim 1, the second storage unit further storing an authentication code, each of the sequential packets having a header which contains an authentication value, wherein step a) includes transmitting the request to the baseboard management controller so as to enable the baseboard management controller to transmit, based on the request, the authentication code as well as the system management data stored in the second storage unit to the processor; and step b) includes receiving the authentication code as well as the system management data from the baseboard management controller, and determining whether the system management data is complete based on the authentication code and the authentication value contained in the header of each of the sequential packets included in the system management data.

9. The method of claim 1, further comprising, subsequent to step b), a step of:

d) generating a data error message notifying that there is an error in the system management data when it is determined that the system management data is not complete.

\* \* \* \* \*